Oct. 15, 1935.    M. D. SULLIVAN ET AL    2,017,263

FLUSHING APPARATUS

Filed Oct. 17, 1933

Inventors
Michael D. Sullivan
and William B. Campbell
By Vernon E. Hodges
Their Attorney Patented Oct. 15, 1935

2,017,263

UNITED STATES PATENT OFFICE 2,017,263

FLUSHING APPARATUS

Michael D. Sullivan and William B. Campbell, Nashville, Tenn.

Application October 17, 1933, Serial No. 693,974

1 Claim. (C. 4—43)

This invention relates to an improvement in flushing devices for closet tanks, in which the usual levers, wires and flushing valves or balls are omitted and instead thereof a combined siphon and trap is employed disposed in the tank so as to control the flushing thereof.

The combined siphon and trap are preferably made in one piece of a tube or pipe bent to form the same for the sake of simplicity and cheapness of manufacture. The structure has an air trap whereby the air locks the water in it and holds the water in the tank up above the top of the siphon until the air is released. The release of the air in the air lock causes water to flow from the tank to the water-closet bowl. A control valve is connected with the air lock in the top of the siphon for the purpose of releasing the air therefrom in order to start the flow of water.

This flushing mechanism is practical, and may be manufactured cheaply because of its simplicity, and it is practically noiseless in operation. The construction is such that it may be installed in new or old tanks as desired and eliminates the usual ball valve, wires and flush-levers ordinarily employed.

Figure 1:
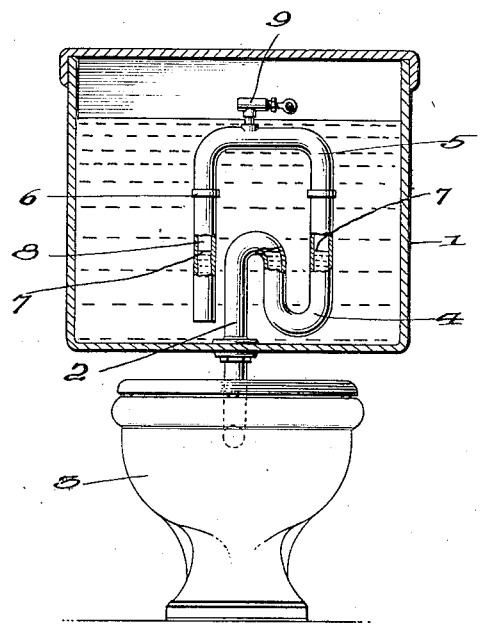
Figure 2:
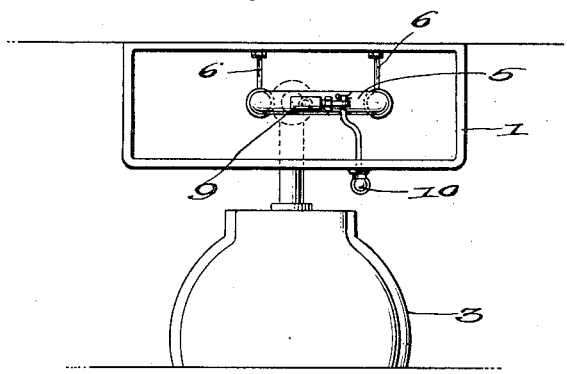

In the accompanying drawing:

Fig. 1 is a sectional view through a tank showing the invention applied thereto; and Fig. 2 is a top plan view thereof with the cover of the tank removed.

The invention is shown as applied to a tank of ordinary construction and designated generally by the numeral 1, and it is intended that the tank shall be equipped with the usual mechanism for filling the same and for controlling the flow of water into the tank and shutting off the in-flow when the water in the tank rises to a predetermined extent. Such mechanism is omitted for simplicity of illustration, but it is understood that it is to be applied and used in connection with this invention.

The tank 1 is provided with a pipe 2 extending from the lower end thereof to the bowl 3. The pipe 2 extends upwardly in the tank 1, being connected with the outlet side of a trap 4, which is shown as formed integral with the pipe 2, and one side of the trap 4 terminates in one side of a siphon 5, the other side of which siphon extends downwardly opposite the trap 4 and pipe 2 to near the bottom of the tank 1, and is open to the interior of the tank. The siphon 5 may, if desired, be supported by suitable braces 6 within the tank.

As shown in Fig. 1, water normally rises in both arms of the siphon 5 to the height designated by the numeral 7 in Fig. 1. Above the point 7 is an air-lock 8 which connects both arms of the siphon and extends downwardly therein to the surface of the water in the siphon arms. This air-lock holds the water in both arms of the siphon and in the trap 4, and also holds the water in the tank 1 at a point above the top of the siphon, preventing flow of the water through the siphon and trap until the air is released. The top of the siphon is provided with a valve 9 for releasing the air from the air-lock 8 to the atmosphere, which valve 9 may be controlled in any suitable way as by a handle 10.

When the valve 9 is opened, it releases the air from the air-lock 8 in the siphon 5, creating a suction in the open arm of the siphon sufficient to start the flow of water through the siphon and the trap into the bowl, which continues until practically all of the water has been emptied from the tank, the emptying action being accomplished quickly and practically noiseless.

The valve 9 is closed upon release of the handle 10 so that as water rises in the tank 1 in the usual way air is trapped in the air-lock 8, building up a pressure sufficient to hold the water in the tank.

We claim:

The combination with a water-closet tank, of flushing apparatus therefor comprising a discharge pipe for the tank having a bent portion thereof forming a water trap disposed in the tank, a siphon pipe having one leg thereof connected directly to one side of the water trap and having the other leg thereof extending downwardly to a point below the top of the water trap in position for sealing both legs of the siphon with water columns in the lower portions thereof and providing an air trap in the upper connected ends of the legs of the siphon, a valve attached directly to the upper portion of the siphon and having an air opening in the tank above the normal water level therein, and actuating means connected with said valve and extending to a point outside of the tank for opening said valve and releasing the pressure of the trapped air in the siphon to start the siphoning action of the water through the discharge pipe.

MICHAEL D. SULLIVAN.
WILLIAM B. CAMPBELL.